Jan. 9, 1940.　　　　　W. HARTEL　　　　　2,186,244
VAPOR ELECTRIC DEVICE
Filed Nov. 22, 1938
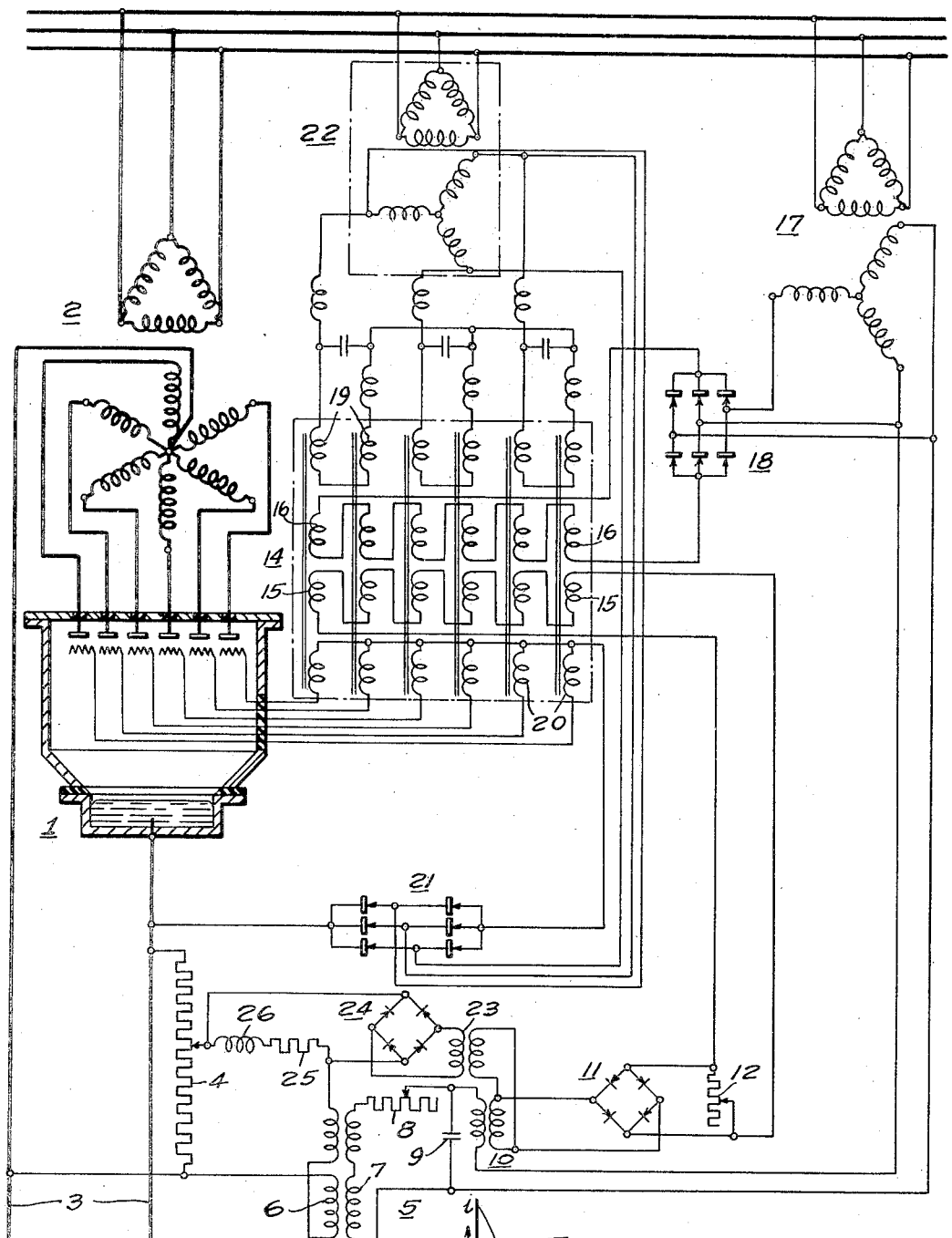
WITNESSES:　　　Fig. 1.　　　　　　　INVENTOR
　　　　　　　　　　　　　　　　　　　Walter Hartel.
　　　　　　　　　　　　　　　　　　BY
　　　　　　　　　　　　　　　　　　　　ATTORNEY Patented Jan. 9, 1940

2,186,244

UNITED STATES PATENT OFFICE 2,186,244

VAPOR ELECTRIC DEVICE

Walter Hartel, Berlin-Charlottenburg, Germany, assignor to Westinghouse Electric & Manufacturing Company, East Pittsburgh, Pa., a corporation of Pennsylvania Application November 22, 1938, Serial No. 241,814
In Germany December 31, 1937

5 Claims. (Cl. 175—363)

The invention relates to a regulating system for a vapor electric converter and particularly to a highly sensitive automatic regulating system in which the resistance of a control circuit is varied by a potential which is a measure of the regulation. The regulating system according to the invention is distinguished by the fact that is operates in a purely electrical manner with a minimum of switching parts and has a very high sensitivity without being subject to fluctuations by alterations, temperature variations and the like. It is particularly adapted for the automatic potential regulation or constant maintenance for grid control rectifiers. The invention may also be used with particular advantage in potential regulation or in the maintenance of constant rotational speed of electrical machines; particularly, when the latter are supplied or excited through controlled converters. In these cases, the regulator, according to the invention, may be permitted to act on the control of the discharge paths of the converter.

According to my invention, the wattless impedance of an oscillating circuit supplied with alternating current is used as a variable impedance for the control circuit. The wattless impedance of the oscillating circuit is formed at least in part by a regulable choke coil on which the direct current potential measuring the regulation acts as preexitation. The use of the oscillating circuit for carrying automatic regulation is in itself known. In the known arrangements, however, frequency dependent regulation is involved in which in contrast to the object of the invention, the oscillating circuit itself remains invariable and is supplied with a variable frequency. An important property of the invention consists in the fact that from the initial circuit of the regulator for proper dimensioning of the oscillation circuit, comparatively large currents may be derived so that with these currents, for example, the premagnetization of a grid transformer serving for the production of impulse grid potentials for a rectifier may be directly effected.

It is, accordingly, an object of my invention to provide a control system for a grid controlled vapor electric device in which the grid impulses are directly affected by the output potential.

It is a further object of my invention to provide a grid control system in which the output potential of a converter is utilized to vary the impedance of a circuit varying the phase relation of the control impulses.

Other objects and advantages will be apparent from the following detailed description taken in conjunction with the accompanying drawing, in which:

Figure 1 is a schematic illustration of a converter employing my excitation system, and Fig. 2 is a graphical illustration of an operating charatceristic according to my invention.

An exemplary embodiment of the invention is illustrated in Fig. 1 of the drawing. In this embodiment, it is desired to maintain constant the potential in the direct current circuit 3 of a grid controlled mercury vapor rectifier 1 which is connected through the transformer 2 to a three-phase circuit. Only a fraction of the direct current potential of the rectifier which is derived from the current divider 4 acts on the actual regulating system. The potential divider 4 accordingly serves as adjuster for the desired value. The potential E derived at the potential divider 4 now controls the current in the premagnetizing winding 6 of a regulable choke coil 5.

The operating winding 7 of this choke coil 5 forms, together with the condenser 9, an oscillating circuit, the damping of which may be set by the impedance 8. The tuning of the oscillating circuit thereby depends on the instantaneous magnitude of the current in the premagnetizing winding 6. The greater the premagnetizing current, the smaller is the inductance present in the oscillating circuit.

The oscillating circuit is connected in series as variable impedance with the secondary winding of the transformer which may, for example, be connected to an auxiliary three-phase network. Since the frequency supplied by the transformer 17 remains constant, the current flowing through the oscillating circuit depends only on the inductance of the winding 7, i. e., accordingly, on the magnetization current of the winding 6. The current flows through the primary winding of a transfer device 10 in the secondary winding of which, accordingly, a corresponding current results. This secondary current is converted into direct current by the auxiliary rectifier 11 and is supplied to the regulable impedance 12. At the terminals of this impedance 12, the potential for the premagnetizing windings 15 of the grid transformers 14 are derived. The grid transformers 14 serve in known manner to provide to the control grids of the rectifier 1, impulse-like ignition impulses of adjustable phase position. Every grid transformer has, for this purpose, in addition to the inducing winding 20 connected to the grid, an alternating current exciting winding 19 fed from the transformer 22 which excites it far above its saturation limit. A change in flux, therefore, is manifested therein only after the instant of the zero point of the resultant excitation. When the alternating current excitation remains constant, this zero passage of the resultant excitation depends on the auxiliary direct current excitation. The latter is composed of the excitation which arises from the winding 15 connected to the regulating arrangement and the excitation supplied by the winding 16. The winding 16 is fed with constant current through the rectifier 18 from the transformer 17 and supplies an excitation of opposite polarity to the polarity of the excitation of winding 15. Accordingly, the larger the exciting current of the winding 15, the smaller becomes the direct current component of the total excitation acting on the transformer 14. Preferably, the arrangement is so designed that with decreasing direct current excitation, the potential impulses supplied by the winding 20 are more and more delayed and the angle at which the rectifiers are excited receive a decrease. The negative blocking potential is supplied by the auxiliary rectifier 21.

In the input circuit of the regulator, not only is the potential E derived from the potential divider 4 effective, but in addition, a further potential E' opposite to the potential E is introduced, the magnitude of which depends on the instantaneous impedance of the oscillating circuit. This potential E' is formed by the potential drop which produces a current in the impedance 25 and the choke coil 26 connected in series therewith which is derived from the secondary winding of the transfer device 10 through an adapting transformer 23 and rectified by the auxiliary rectifier 24. The choke coil fulfills here a double function. First at one time it serves for smoothing the current delivered by the rectifier 24 and then, however, by means of it, the time constant of the circuit for the potential E' is adjusted. This is of considerable significance for the avoidance of oscillation phenomena in the regulation. Preferably, the time constant of this circuit is selected approximately so large as the time constant of the control circuit containing the grid transformer winding 15 which in its turn is adjusted by the choke coil 13. The introduction of the potential E' which varies linearly with the magnitude of the current in the control circuit instead of the otherwise usual constant equalization potential has first the effect that the cosine form of characteristic line which the direct current potential of the rectifier 1 as a function of the ignition point displacement has, plays no part any longer in the regulating process. Above all, however, the elastic counter potential permits the adjustment of any selected desired value since it automatically adapts itself to any desired value.

The operating point of the oscillation circuit is preferably located in a region in which the wattless impedance of the oscillating circuit increases with increasing inductance of the regulating choke. These relationships are graphically illustrated in Fig. 2. Here indeed the dependence of the wattless impedance on the inductance L is not plotted but on the other hand, the dependence of the current $i$ flowing through the oscillating circuit is plotted as a function of $wL$. It will be recognized that the current $i$ decreases with increasing inductance at first approximately linearly and steeply, then, however, it gradually becomes deflected in horizontal direction and finally again rises. The fact that the current $i$, after attaining a minimum value, again rises need have no unpropitious effect on the regulating process for proper dimensioning of the regulating choke. Care need only be taken that the maximum of the inductance of the choke coil, i. e., accordingly, the condition of its full desaturation lies below that inductance value at which the current through the oscillating circuit attains its minimum. Under such circumstances, even a sudden variation of the rectifier potential just as large does not influence the regulator to the extent that a regulating influence in the reverse sense becomes noticeable. For itself, it would be possible for corresponding selection of the polarity to operate on the rising branch of the characteristic line. This branch, however, has a smaller slope than the dropping branch, so that the amplification would be smaller. The regulating chokes must be dimensioned larger in such a case because of the required higher inductance.

With the regulator according to the invention, a compound effect may also be attained. For this purpose, series chokes influenced by the current may, for example, be used in known manner; or again a further current dependent potential, which is supplied, for example by an impedance through which flows an operating current proportional to the direct current may be introduced into the inductor circuit in series with the potential E and E'.

I claim as my invention:

1. An automatic regulating system for a controlled vapor electric device having a plurality of arc paths comprising an impulsing transformer system, a premagnetizing winding on said impulsing transformer, a source of potential responsive to the regulation of the device, an oscillating circuit including a regulable choke coil, a source of alternating current connected to said oscillating circuit, connections for impressing the potential responsive to the regulation on said oscillating circuit to vary the wattless impedance of said circuit, and means for impressing a potential controlled by the wattless impedance of the oscillating circuit on the premagnetizing winding of the impulsing transformer.

2. Regulating arrangement according to claim 1, characterized by the fact that the operating point of the oscillating circuit lies in a range, in which the wattless impedance increases with rising inductance of the choke coil.

3. A control system for a grid controlled vapor electric converter having a plurality of arc paths comprising a saturated core impulsing transformer including primary exciting windings, impulse windings and a plurality of premagnetizing windings, means for supplying a constant premagnetizing current to one of said premagnetizing windings, means including an oscillating circuit for supplying premagnetizing current to another of said premagnetizing windings.

4. A control system for supplying control impulses to the grids of a grid controlled vapor electric device comprising an impulsing transformer having individual legs for each control impulse, a source of exciting current capable of exciting said transformer above the saturation limit, two premagnetizing windings on each leg of said transformer, means for supplying a substantially constant current to one of said premagnetizing windings, means including an oscillating circuit for supplying current to the other of said premagnetizing windings and means responsive to the load potential of the converter for varying the tuning of said oscillating circuit.

5. An automatic regulating system for a vapor electric converter having a plurality of arc paths comprising an impulsing transformer aggregate having individual sections corresponding to the arc paths, an alternating current exciting winding for said impulsing transformer, a source of potential connected to said exciting winding, a premagnetizing winding on said impulsing transformer, an oscillating circuit including a capacitance and an inductance, a premagnetizing winding associated with said inductance, a source of potential proportional to the load potential, means for impressing said potential on the premagnetizing winding of said inductance to vary the tuning of the oscillating circuit, a source of alternating current connected to said oscillating circuit, an auxiliary transformer connected in series with said oscillating circuit, and means for impressing the output potential of said auxiliary transformer on the premagnetizing winding of said impulsing transformer.

WALTER HARTEL.